Feb. 11, 1930. W. E. WINE Re. 17,591
FREIGHT CAR
Original Filed Nov. 8, 1926 10 Sheets-Sheet 1
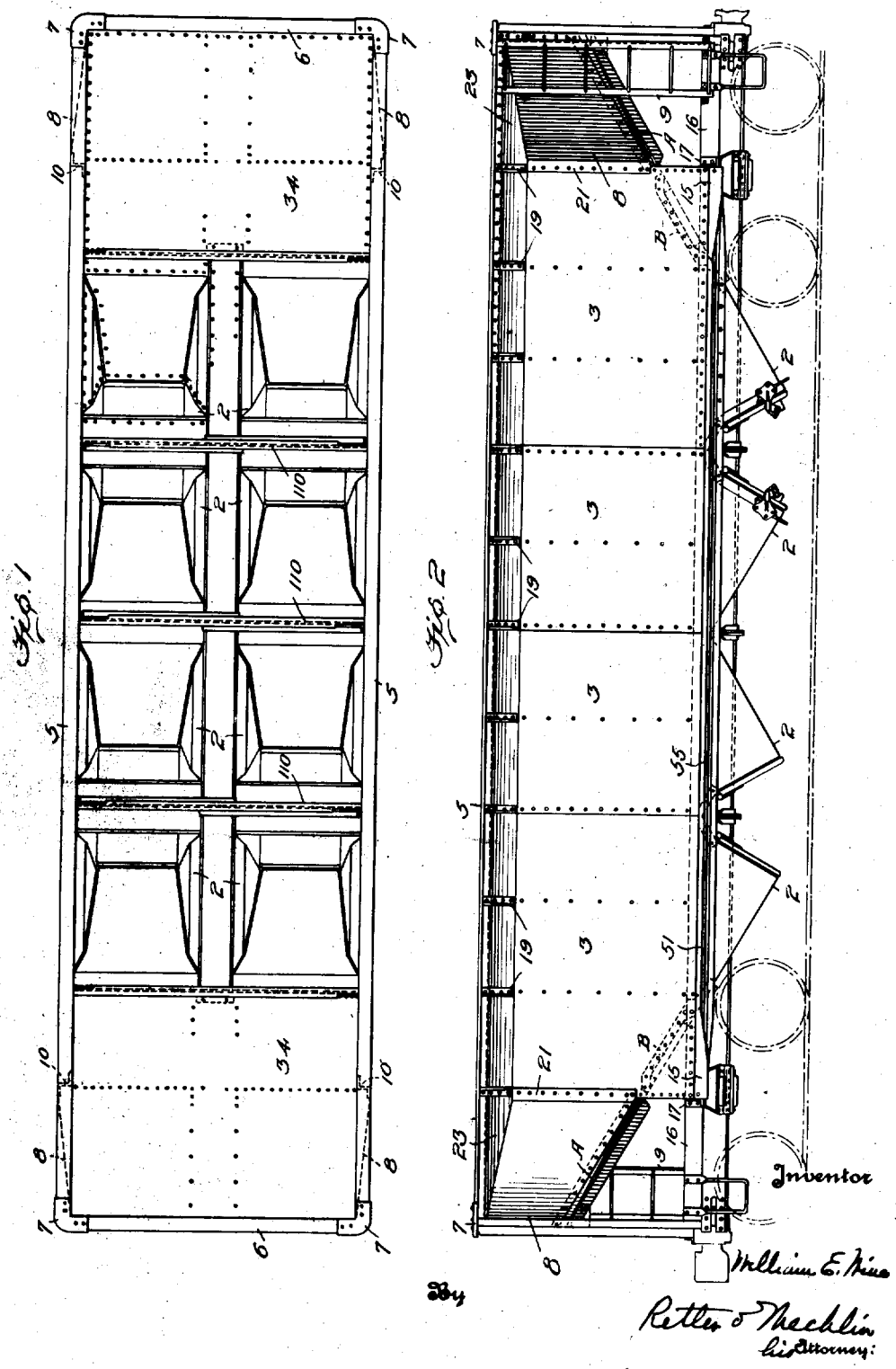

Feb. 11, 1930. W. E. WINE Re. 17,591

FREIGHT CAR

Original Filed Nov. 8, 1926 10 Sheets-Sheet 2

Inventor

William E. Wine

By Ritter & Mechlin

His Attorneys

Feb. 11, 1930. W. E. WINE Re. 17,591

FREIGHT CAR

Original Filed Nov. 8, 1926 10 Sheets-Sheet 3

Inventor

William E. Wine

By Ritter & Meeklin his Attorneys

Feb. 11, 1930. W. E. WINE Re. 17,591

FREIGHT CAR

Original Filed Nov. 8, 1926 10 Sheets-Sheet 4

Inventor

William E. Wine

By Ritter & Mechlin his Attorneys

Feb. 11, 1930. W. E. WINE Re. 17,591

FREIGHT CAR

Original Filed Nov. 8, 1926 10 Sheets-Sheet 5

Inventor

William E. Wine

By Ritter & Mechlin his Attorneys

Feb. 11, 1930. W. E. WINE Re. 17,591

FREIGHT CAR

Original Filed Nov. 8, 1926 10 Sheets-Sheet 6

Inventor

William E. Wine

By Ritter & Mechlin his Attorneys

Feb. 11, 1930. W. E. WINE Re. 17,591
FREIGHT CAR
Original Filed Nov. 8, 1926 10 Sheets-Sheet 7
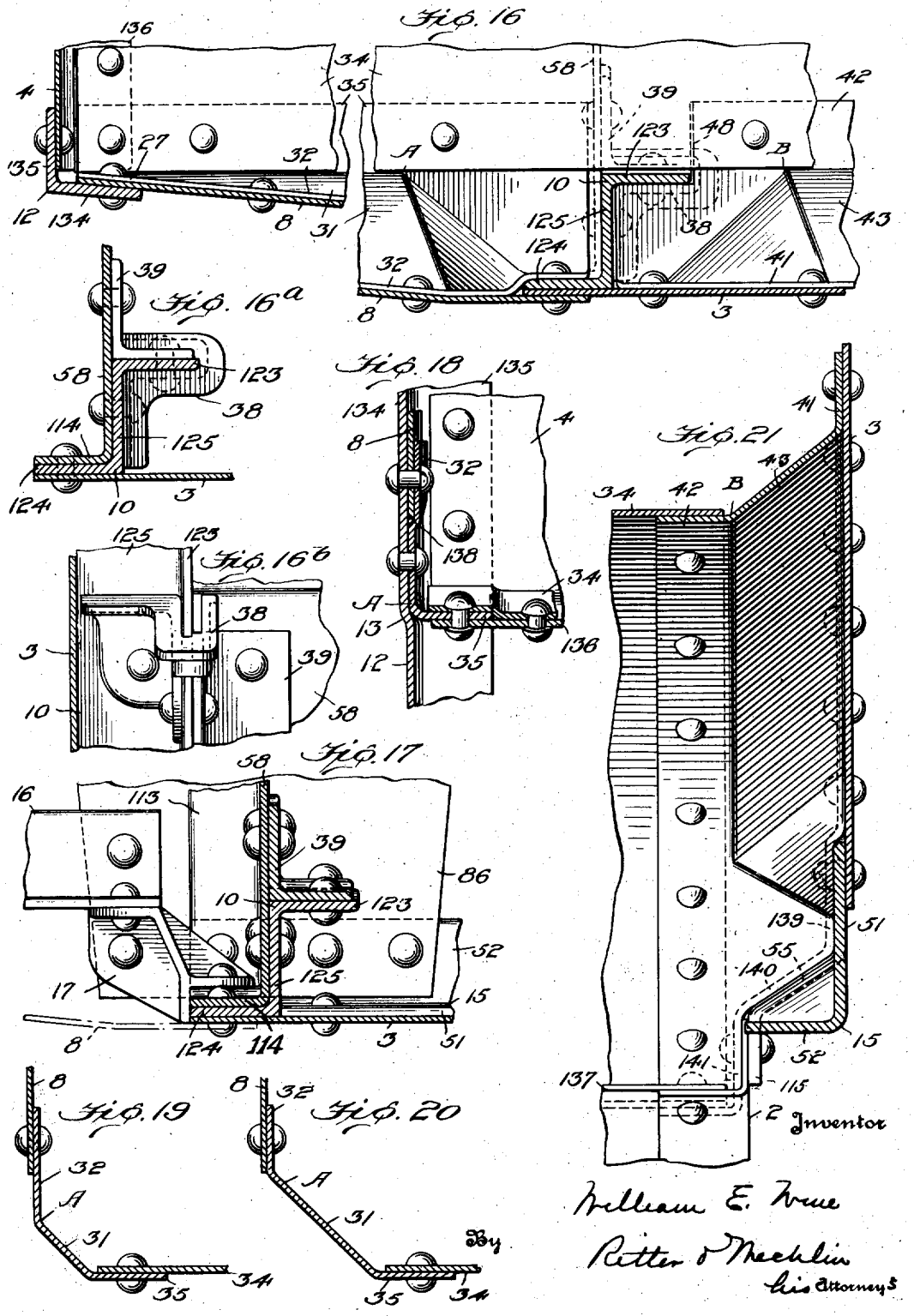
Inventor
William E. Wine
By Ritter & Mechlin
his Attorneys Feb. 11, 1930. W. E. WINE Re. 17,591
FREIGHT CAR
Original Filed Nov. 8, 1926 10 Sheets-Sheet 8
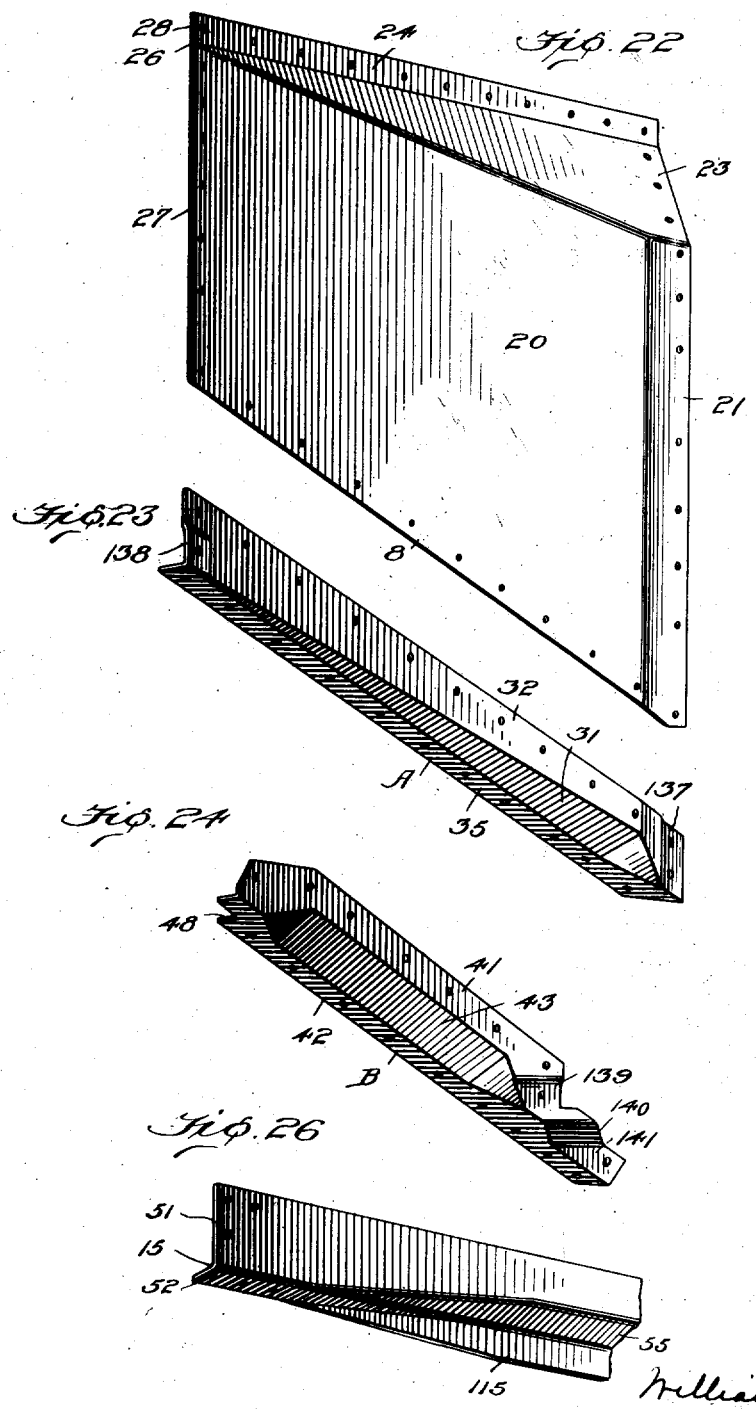
Inventor
William E. Wine
By
Ritter & Moeblin
Attorneys Feb. 11, 1930. W. E. WINE Re. 17,591

FREIGHT CAR

Original Filed Nov. 8, 1926 10 Sheets-Sheet 9

Inventor

William E. Wine

By Potter & Machlin

His Attorneys

Feb. 11, 1930. W. E. WINE Re. 17,591
FREIGHT CAR
Original Filed Nov. 8, 1926 10 Sheets-Sheet 10
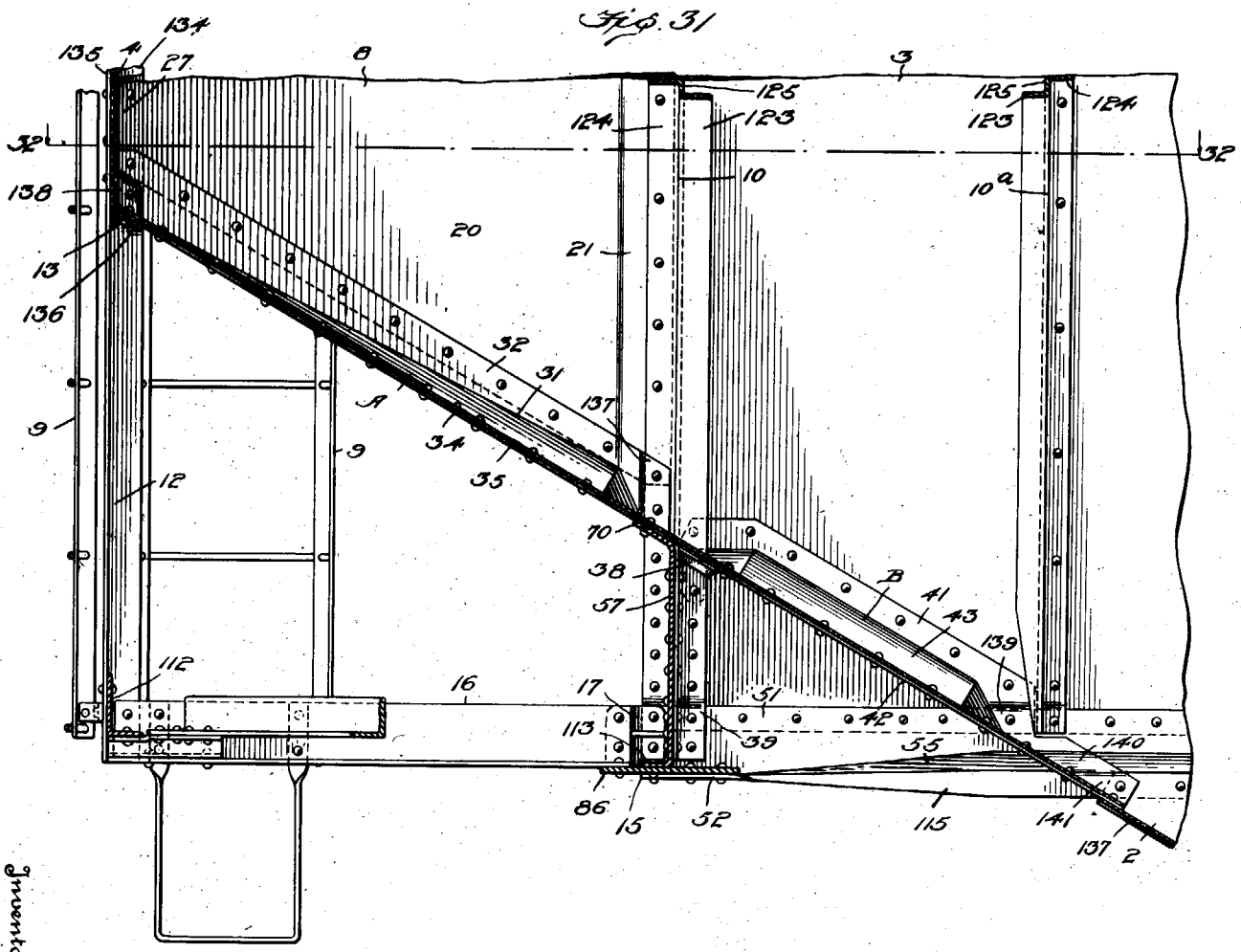
Inventor
William E. Wine
By Ritter & Mechlin
Attorneys Reissued Feb. 11, 1930 Re. 17,591

UNITED STATES PATENT OFFICE

WILLIAM E. WINE, OF TOLEDO, OHIO, ASSIGNOR TO WINE RAILWAY APPLIANCE COMPANY, OF TOLEDO, OHIO, A CORPORATION OF OHIO

FREIGHT CAR

Original No. 1,703,756, dated February 26, 1929, Serial No. 146,977, filed November 8, 1926. Application for reissue filed September 17, 1929. Serial No. 393,255.

My invention relates to new and useful improvements in freight cars designed to have a maximum capacity within the prescribed clearance limitations.

One of the objects of the invention is to construct a railway freight car, such as a hopper car, with reduced ends so that safety appliances and the like may be applied on the sides of the car adjacent its ends and yet be disposed within the limits defined by the maximum distance between the sides of the car.

Another object of the invention is to form the interior of the car so that granular lading, such as coal and the like, will readily discharge from the car, whether this is accomplished by inverting the car or by opening drop doors in the bottom thereof.

Another object of the invention is to provide a railway car with an improved cross bearer construction.

One of the primary features of the invention resides in providing a hopper car having inside side stakes with means associated with the slope sheets whereby the interior of the car is formed with transversely inclined portions which facilitate the movement of granular lading down the slope sheets as it is being discharged from the car through the drop doors.

Another feature of the invention resides in providing the car with improved means for connecting the slope sheets and side sheets adjacent the ends of the car, the connecting means being generally of trough shape and affording, when applied to the car, transversely inclined portions which serve to prevent any substantial quantity of the lading from becoming entrapped by the inside side stakes of the car while the lading is being discharged through the doors in the bottom thereof.

A still further feature of the invention resides in constructing the end side sheets of the car so that they may be easily shaped in large quantities at a minimum expense and applied to the car with the facilities of the average railroad repair shop.

A still further feature of the invention resides in providing novel means associated with the car side stakes for supporting adjacent portions of the slope sheets.

A still further feature of the invention resides in providing the car with corner posts of a design particularly adapted to co-operate with the converging end side sheets of the car.

A still further feature of the invention consists in providing the car with cross bearers formed of a plurality of plates.

A still further feature of the invention consists in attaching to the central portions of the cross bearers tie rods which are adapted to brace the car sides.

Other and more specific features of the invention residing in advantageous forms, combinations and relations of parts will hereinafter appear and be pointed out in the claims.

In the drawings illustrating a preferred embodiment of the invention:

Figure 1 is a diagrammatic plan view of a hopper car.

Figure 2 is a diagrammatic side view of the car.

Figure 6:
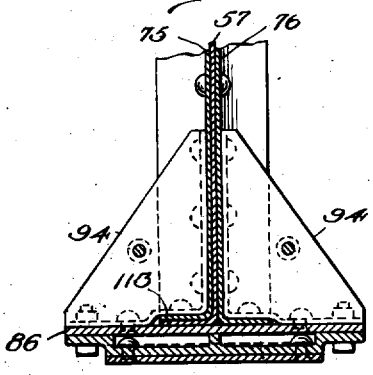
Figure 6 is an enlarged fragmentary sectional view taken on line 6—6, Figure 5.
Figure 6A:
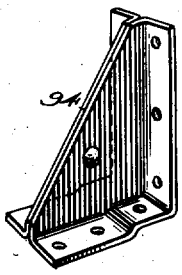

Figure 6[a] is a perspective view of one of the braces shown in Figure 6.

Figure 7:
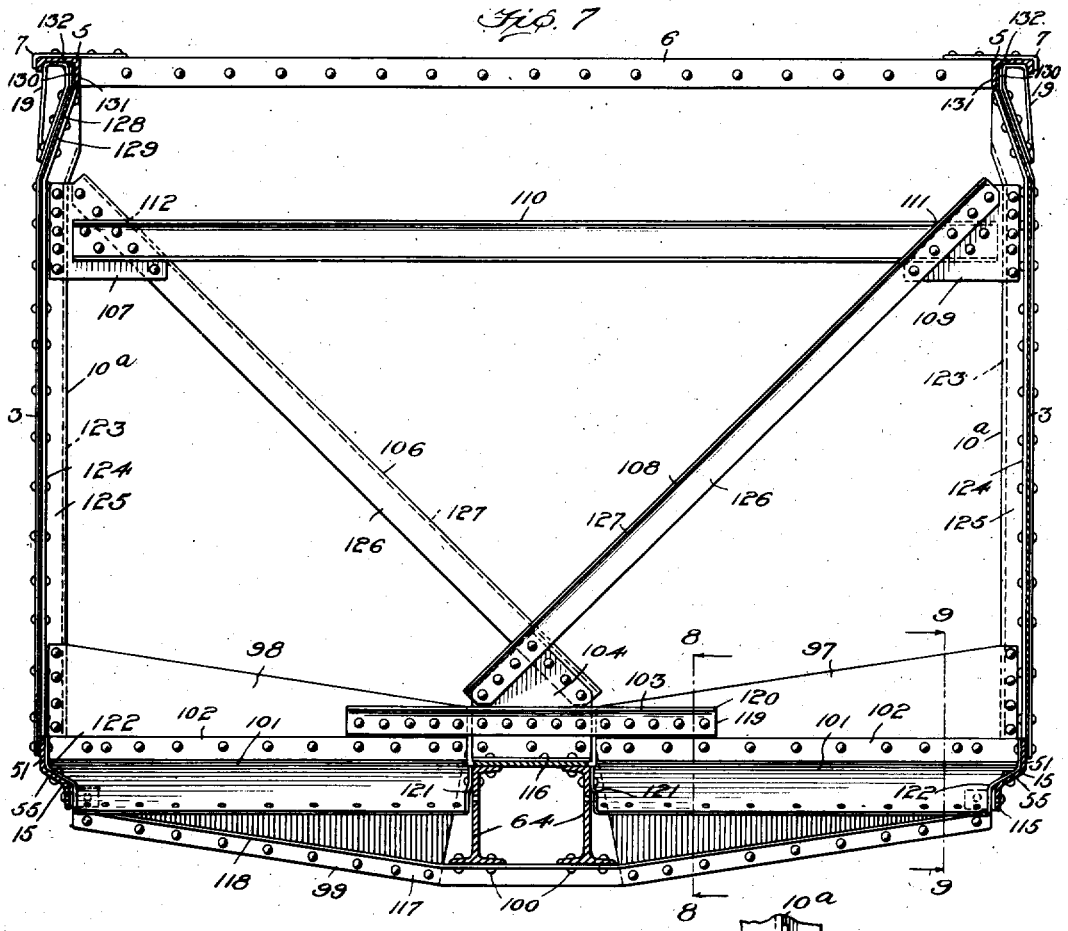

Figure 7 is a vertical transverse sectional view of the car showing one of the cross bearers in elevation.

Figure 8:
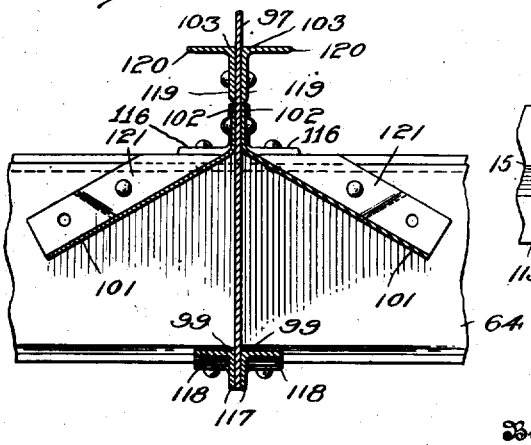

Figure 8 is an enlarged sectional view taken on line 8—8, Figure 7.

Figure 9:
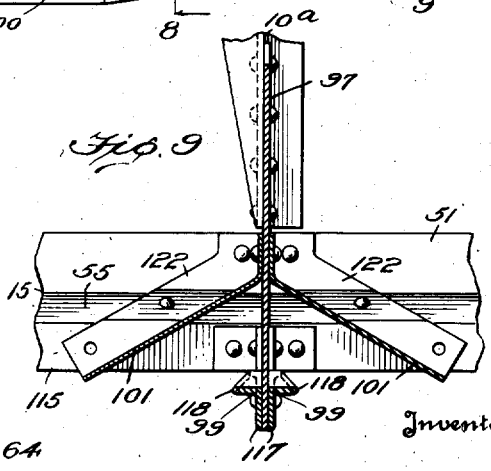

Figure 9 is a similar view taken on line 9—9, Figure 7.

Figure 10:
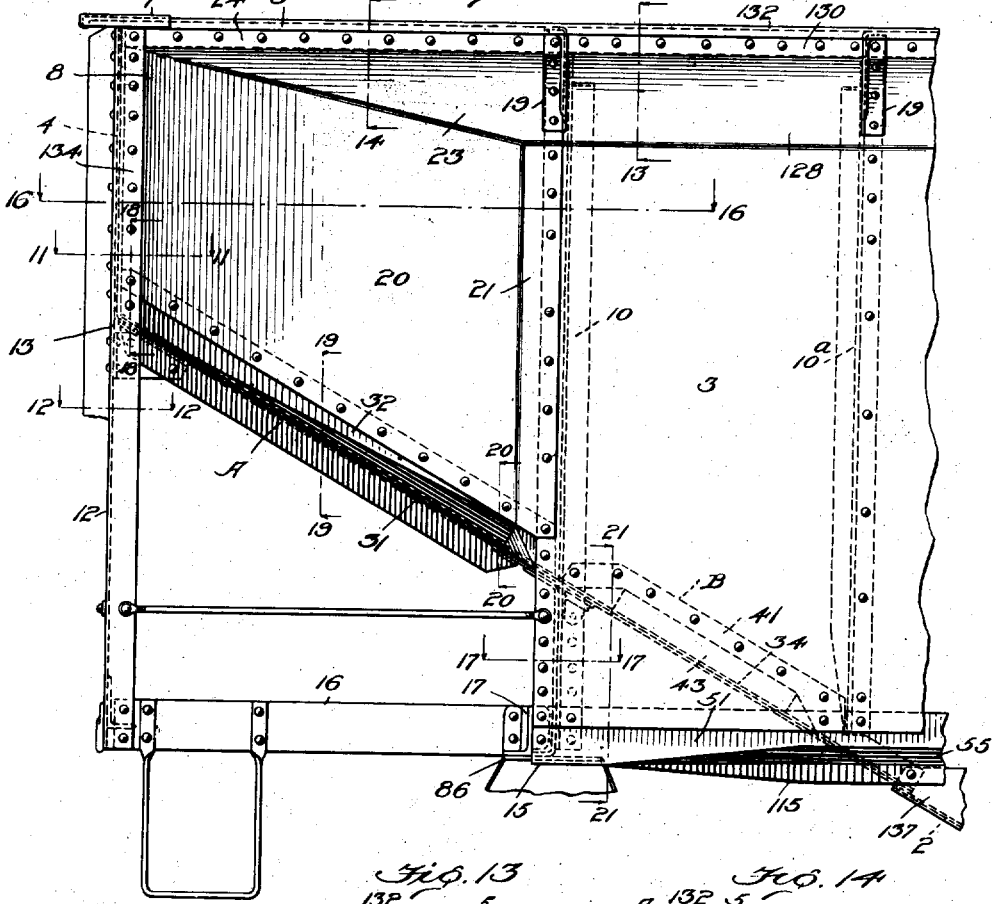

Figure 10 is a fragmentary side elevational view of the car adjacent one of its ends.

Figure 11:
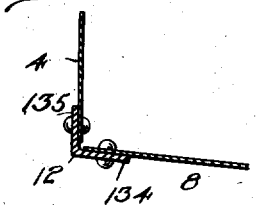

Figure 11 is a fragmentary sectional view taken on line 11—11, Figure 10.

Figure 12:
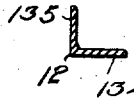

Figure 12 is a fragmentary sectional view taken on line 12—12, Figure 10.

Figure 13:
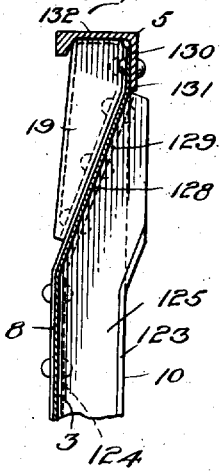

Figure 13 is a fragmentary sectional view taken on line 13—13, Figure 10.

Figure 14:
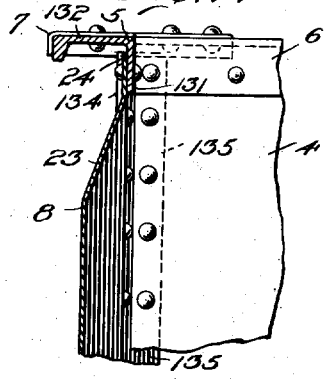

Figure 14 is a similar view taken on line 14—14, Figure 10, showing the decreasing inclination in the upper portion of the end side sheet.

Figure 4:
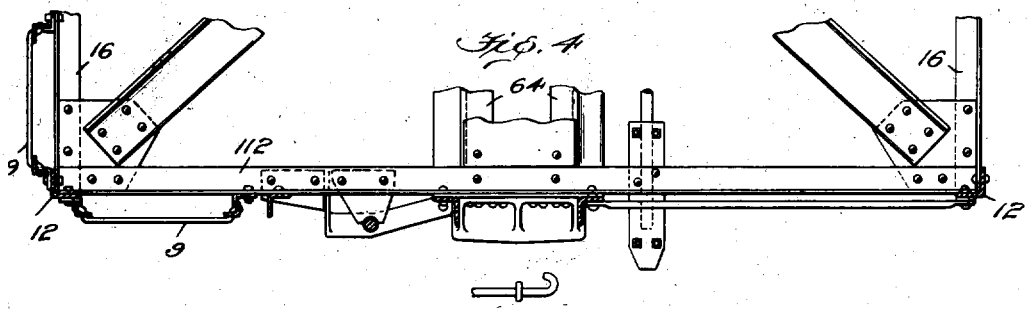
Figure 4 is a fragmentary sectional view taken on line 4—4, Figure 3.
Figure 3:
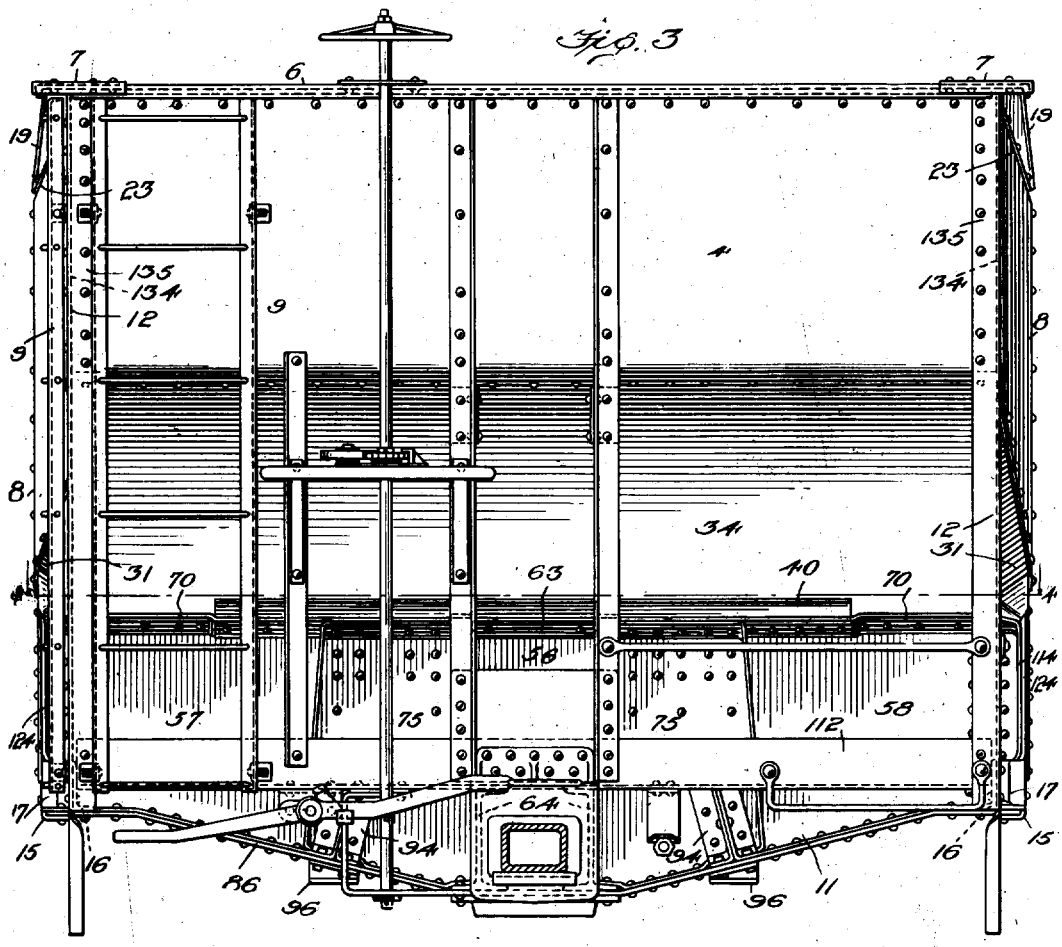
Figure 3 is an end view of the car.
Figure 5:
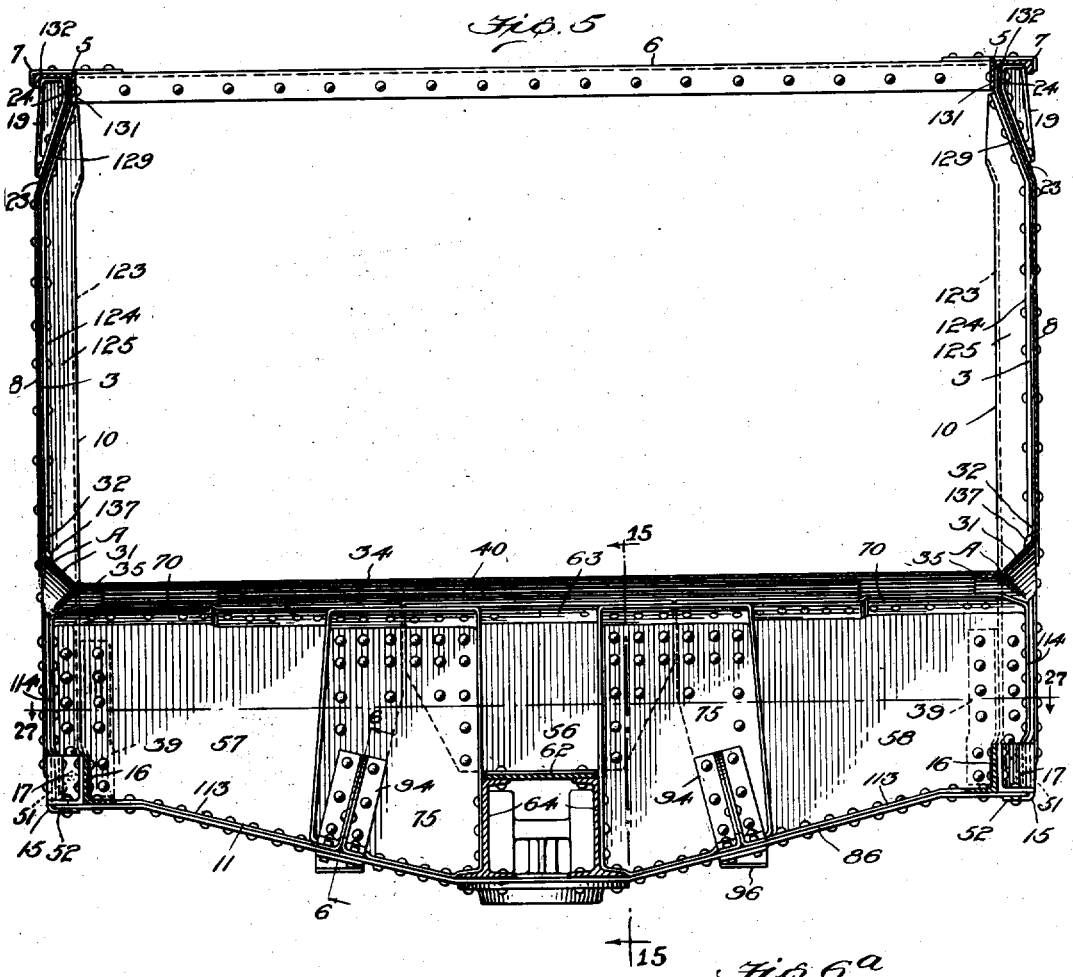
Figure 5 is a transverse sectional view of the car showing the body bolster in elevation.
Figure 15:
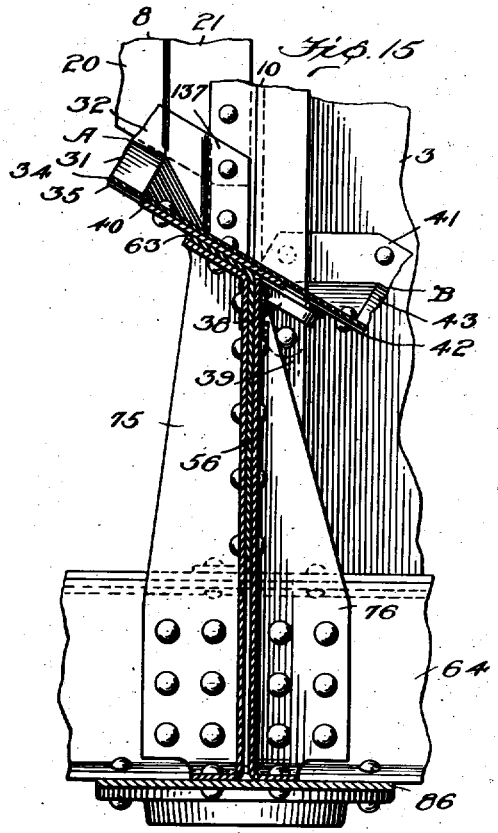

Figure 15 is a sectional view taken on line 15—15, Figure 5.

Figure 16 is an enlarged fragmentary sectional view taken on line 16—16, Figure 10.

Figure 16[a] is an enlarged sectional view taken immediately below the slope sheet of the car adjacent the side thereof, showing in elevation the slope sheet supporting bracket illustrated in Figure 16.

Figure 16[b] is a view of the construction illustrated in Figure 16[a] taken at right angles thereto.

Figure 17 is an enlarged sectional view taken on line 17—17, Figure 10.

Figure 18 is a fragmentary sectional view taken on line 18—18, Figure 10.

Figure 19 is a sectional view taken on line 19—19, Figure 10.

Figure 20 is a similar view taken on line 20—20, Figure 10.

Figure 21 is a vertical sectional view taken on line 21—21, Figure 10.

Figure 22 is a perspective view of one of the end side sheets.

Figure 23 is a perspective view of one of the slope sheet supporting members designated "angle A".

Figure 24 is a perspective view of another of the slope sheet supporting members designated "angle B".

Figure 25:
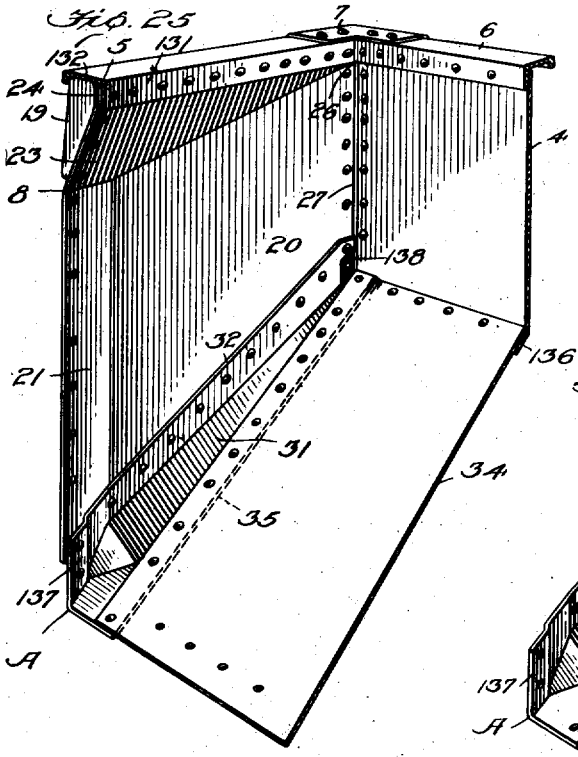

Figure 25 is a fragmentary perspective view taken on the inside of the car showing the construction thereof adjacent one of its corners.

Figure 26 is a fragmentary perspective view of one end of one of the side sills.

Figure 27:
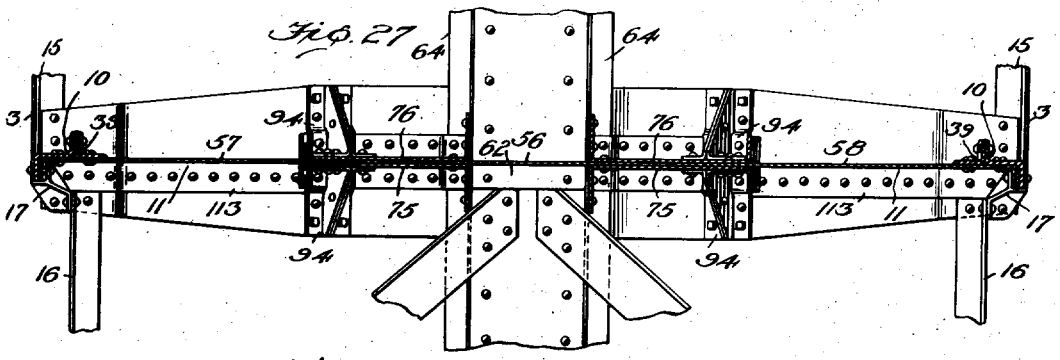

Figure 27 is a sectional view taken on line 27—27, Figure 5.

Figure 28:
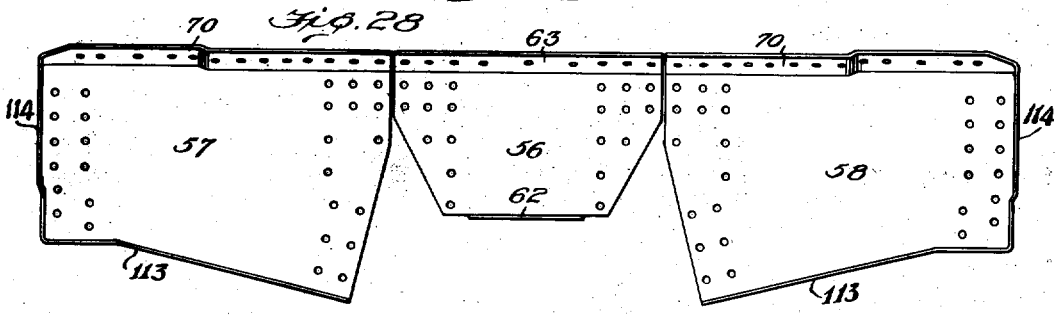

Figure 28 is a side elevational view of the center and end plates of the composite bolster in their assembled position.

Figure 29:
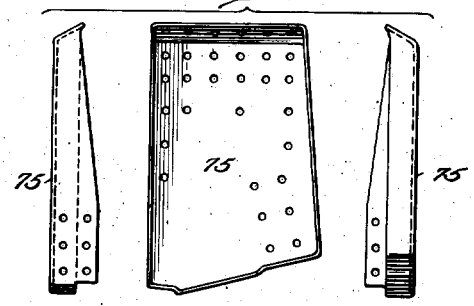

Figure 29 illustrates side and end views of one of the reinforcing plates applied to one side of the bolster.

Figure 30:
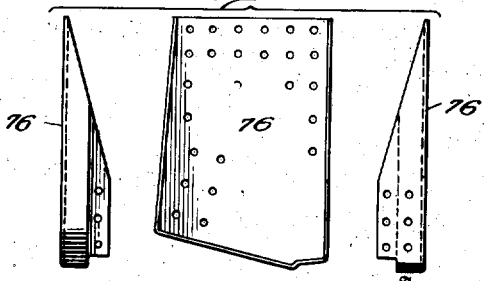

Figure 30 illustrates similar views of one of the reinforcing plates applied to the opposite side of the bolster.

Figure 31 is an enlarged fragmentary vertical sectional view longitudinally of the car adjacent one end thereof.

Figure 32:
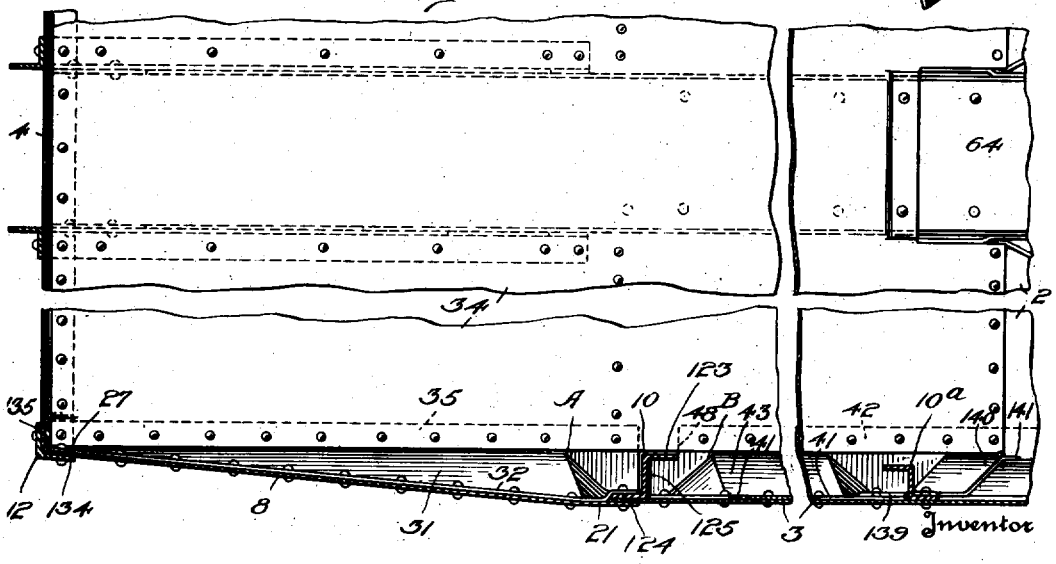

Figure 32 is a fragmentary sectional view taken on line 32—32, Figure 31.

Figure 33:
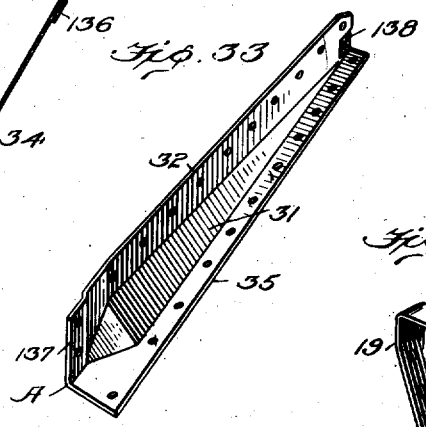

Figure 33 is a perspective view of angle A taken on the side opposite to the side of that of the view shown in Figure 23.

Figure 34:
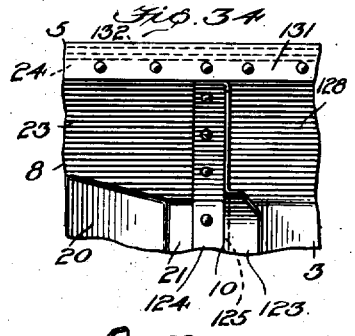

Figure 34 is a fragmentary side view of the inside of the car adjacent the top of one of the side stakes.

Figure 35:
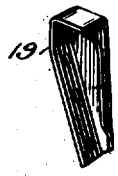

Figure 35 is a perspective view of one of the brackets adjacent the top of the car.

As the construction adjacent each end of the car is the same, only one end thereof has been illustrated in most instances and will be described in the specification. Furthermore, since the construction on opposite sides of the car is identical in all material aspects, only one side thereof will be described in the specification.

Referring more particularly to the drawings, 64 designates the center sills of the car which, as is well known, extend substantially continuously from one end of the car to the other, being secured to the end sills 112 by any suitable means. The body bolsters 11 of the car are rigidly connected to the center sills, and since the bolsters chosen for purposes of illustrating the invention form the subject matter of my Patent No. 1,703,758, being a division of the application which eventuated in the original patent upon which this reissue is based, this construction will not be herein described in detail. It may be said, however, that each bolster generally comprises three main plate-like members 56, 57 and 58, respectively. The center plate 56 is provided with a lower flange 62 for attachment to the car center sill and with an upper flange 63 for attachment to the under side of the inclined floor of the car. Each of the side plates 57 and 58 is formed with a top flange 70 adapted to be in alinement with the top flange 63 of the center plate 56, bottom flanges 113 and side or end flanges 114. At their upper edges these plates are connected by a plate 40 rigidly secured to their top flanges, while at their bottom edges they are connected by a plate 86 rigidly secured to the flanges 113 which passes under the center sills. The bolster plates are also connected by two pairs of reinforcing plates 75 and 76, respectively, disposed on opposite sides of the center sills, the plates of each pair overlapping opposite faces of the bolster plates. Reinforcing brackets 94 are also preferably secured to the bolster directly over the bearing plates 96 which are adapted to co-operate with truck side bearings (not shown).

The main side sills 15 of the car which preferably terminate at the bolsters form the subject matter of my Patent No. 1,703,804 and need not be described herein in detail. The ends of the side sills, however, are of angle shape, one leg 51 of each being secured to the adjacent end flange 114 of the bolster, and the other leg 52 being secured to the bottom flange 113 thereof. Intermediate its ends each side sill is of Z shape, having a lower vertical flange 115, an inclined web 55, and an upper flange which constitutes a continuation of the leg 51. Extending between the body bolsters and the respective ends of the car are auxiliary side sills 16 of angle shape. At one end each of the angle members 16 is secured to the adjacent end sill 112, while at its other end it is secured to the bolster through the intermediacy of a bracket 17.

Intermediate the bolsters the side sills and the center sills of the car are connected by cross bearers, each of which generally comprises three plates 97, 98 and 104. The center plate 104 is positioned directly over the center sills 64, being rigidly secured thereto by angle members 116, while the side plates 97 and 98 are positioned respectively between the center sills and side sills, the outer side edges of each being shaped to conform to the contour of the side sills. Extending under the center sills 64 are a plurality of angle members 99 respectively adapted to be rigidly secured to opposite sides of the plates 97 and 98 of each cross bearer adjacent their lower edges. These angle members 99 preferably extend continuously from one side sill to the other, and one leg 117 of each is disposed in a plane parallel with and connected to the side plates, while the other leg 118 thereof projects laterally from the cross bearer, the latter leg being secured to the center sills by rivets 100. As may be clearly seen in Figure 9, the laterally projecting flanges 118 of the members 99 may decrease in width as they approach the side sills, as at these points the bending moments to which the cross bearers are subjected are a minimum. Above the center sill the three main plates comprising the cross bearer are rigidly connected by members 103 respectively overlapping opposite faces of the plates. These members are also of angle shape, each having a substantially vertical leg 119 secured to the plates and a substantially horizontal leg 120 projecting laterally therefrom.

The upper edge of each of the side plates of the cross bearers inclines upwardly from adjacent the center sills to the adjacent side of the car to thereby afford at that point an increased area for attaching the plate to neighboring portions of the car construction. The center plate 104 of the cross bearer projects upwardly above the adjacent inner ends of the side plates thereof and its upper portion is substantially of triangular shape to afford means for attaching suitable braces or tie rods to be hereinafter described. Secured to opposite sides of each of the end plates of the cross bearers are ridge sheets 101 which form continuations of the slope sheets of adjacent hoppers. Each of these sheets is fashioned with an upper flange 102 adapted to be secured to the adjacent side plate of the cross bearer and with inner and outer flanges 121 and 122, respectively, adapted to be secured to the adjacent center sill and side sill. As may be clearly seen upon referring to Figures 7 and 9, the outer edges and the outer flanges 122 of the ridge sheets conform to the contour of the adjacent side sill so as to have extended contact therewith.

Spaced along opposite sides of the car are the car side stakes 10 and 10ᵃ, each being preferably of Z shape, having oppositely projecting inner and outer flanges 123 and 124, respectively, and an intermediate web 125. Each side stake is arranged so that its flanges are parallel with the longitudinal axis of the car, while its web is substantially normal thereto. The side stakes 10 are respectively rigidly secured to the opposite ends of the bolsters by rivets which respectively pass through the webs 125 thereof and the main body portions of the end plates 57 and 58 of the bolster and through the outer flanges 124 thereof and the side or end flanges 114 of the bolster. In this manner it will be perceived that a very rigid connection is obtained between the bolsters and side stakes and this is particularly desirable as substantially all of the lateral force exerted by the lading within the car is transmitted from the sides thereof to these side stakes and thence into the body bolsters.

The side stakes 10ᵃ are mounted at each end of the cross bearers, being rigidly connected thereto by rivets which pass through the webs of the stakes and adjacent portions of the plates 97 and 98 of the cross bearers. Upon referring to Figure 9 it will be perceived that the side stakes 10ᵃ preferably terminate short of the side sills, while, upon referring to other figures of the drawings, it will be seen that the side stakes 10 are rigidly secured to adjacent portions of these sills. In order to brace the sides of the car intermediate the bolster, tie rods 106 and 108 are employed which are respectively connected to the side stakes adjacent the upper ends of the latter and to the cross bearer adjacent the central portion thereof. It is for this purpose, namely, to secure the tie rods to the cross bearer, that the center plate 104 of the latter projects upwardly above the adjacent inner ends of the side plates 97 and 98 and terminates in a substantially triangularly shaped portion. Each of the tie rods is preferably of angle shape, having one leg or flange 126 secured to the center plate 104 and another leg or flange 127 projecting laterally therefrom. The tie rods secured to each cross bearer are respectively secured to opposite faces of the plate 104 thereof, so that the flanges or legs 127 of the tie rods project in opposite directions. At their upper ends the rods 106 and 108 are respectively connected to the side stakes through the intermediacy of plates or brackets 107 and 109, respectively. These plates are secured, preferably by rivets, to the webs of the side stakes and to the flanges 126 of the tie rods. In order that the plates will not interfere with the laterally projecting flanges of the tie rods they preferably overlap the faces of the flanges 126 which are remote from the laterally projecting flanges 127.

To more firmly brace the upper portions of the car, horizontally disposed braces 110 may advantageously be employed. These braces respectively overlap the faces of the plates 107 and 109 opposite to the ones overlapped by the tie rods. As it is desirable that these braces comprise flanged beams each is preferably of I-section, but the flanges thereof are preferably cut away, as at 111 and 112, where they are secured to the plates 107 and 109 and the tie rods 106 and 108. From the foregoing it will be perceived that by bracing the car in this manner and by employing tie rods for connecting the upper portions of the side stakes to central portions of the cross bearers a very rigid, yet simple, car construction is produced.

Intermediate the side stakes 10 the sides of the car are formed by sheet metal plates 3, each of which is overlappingly secured together and to the outer flanges 124 of the side stakes 10 and 10[a]. Adjacent their upper portions each of the side sheets and the side stakes 10 and 10[a] incline upwardly and inwardly, as at 128 and 129, respectively. These inclined portions 128 of the side sheets terminate in upwardly projecting substantially vertical flanges 130 for attachment to vertical legs 131 of adjacent side top rails 5. The top rails of the car may conveniently be bulb angles having, in addition to the vertical leg 131, an outwardly projecting substantially horizontal leg or flange 132 disposed above and overlapping the inclined portions of the side sheets. Brackets 19 may advantageously be employed for reinforcing this top construction of the car. Each of these brackets is disposed on the outer face of the inclined portion of the adjacent side sheet and is riveted thereto and to the inclined portion of the adjoining side stake and to the outwardly projecting flange 132 of the top rail. The end top rails 6 are similar in shape to the side top rails and may be rigidly connected thereto in any suitable manner, such as by corner plates or brackets 7. Each of the side sheets 3 extends continuously from the top rails 5 to the side sills 15 and they are preferably secured along their lower edges to the outer faces of the vertical flanges 51 of the sills.

By providing the side sheets of the car with the upwardly and inwardly inclined portions and by positioning the top rails of the car in the manner illustrated, it will be appreciated that a car of maximum width is obtained in which all relatively sharp angles and pockets usually present on the inside of the top construction of the car are entirely eliminated, thereby facilitating the discharge of lading from the car when it is inverted for that purpose.

While from the foregoing it will be perceived that a car construction has been disclosed wherein the side sheets of the car may be spaced the maximum distance permitted by standards of railroad practice, the side construction of the car adjacent the ends must be so formed that ladders 9 and other safety appliances may be applied thereto and not project beyond the limits defined by the sides of the car. For this purpose the ends of the car are reduced or restricted, as may be clearly seen by reference to Figures 1 and 2 and also other figures of the drawings. Thus, the corner posts 12 of the car, which may advantageously be of angle shape, are disposed inwardly with respect to the adjacent side stakes 10 being secured at their lower ends to the angle side sills 16 and end sills 112 and at their upper ends to the top rails 5 and 6. The end side sheets 8 of the car respectively extend from the corner posts 12 to the side stakes 10 and each is provided with a main body portion 20 which inclines inwardly with respect to the parallel or normal sides of the car. The amount of inclination or convergence of these end side sheets is clearly indicated by the dotted lines in Figure 1. Adjacent their inner vertical edges each end side sheet is formed with a marginal flange 21 disposed in a plane parallel with the adjacent car side and overlappingly secured to the outer face of the adjacent side sheet 3 and to the outer flange 124 of the side stake. As the marginal flange 21 of the end side sheet is disposed in a plane parallel with the car sides it, of course, is disposed in a plane forming an angle with the main body portion 20 of its sheet. Adjacent their outer vertical edges each end side sheet overlaps the inner face of the leg 134 of the adjacent corner post and is secured thereto by any suitable means, such as rivets. While the leg 134 of each stake is preferably arranged substantially normal to the other leg 135 thereof, it is preferably offset intermediate its ends as at a point 13 to lie in a plane parallel with the main body portion 20 of the adjacent end side sheet. Thus, it will be seen that the legs of the corner posts adjacent their points of attachment to the end side sheets are flared and that at these points, instead of being at right angles to each other, they are at obtuse angles.

The upper portion of each end side sheet is formed with an inwardly and upwardly inclined or trough portion 23 which is in alinement with and constitutes a continuation of the inclined portions 128 of the adjacent side sheets 3. As the plane of the inclined portion of each end side sheet forms an angle longitudinally of the car with the main body portion 20 thereof it gradually decreases in width as it approaches the end of the car, preferably merging with the body portion adjacent the outer edge 27 thereof at a point designated 26. The upper edge of each end side sheet is fashioned with a substantially vertical flange 24 extending at an angle to the main body portion 20 for attachment to the depending or vertical leg 131 of the adjacent side top rail 5. At its outer edge 28 the top flange 24 is disposed in substantially the plane of the main body portion 20 of the sheet.

The inclined or sloping floors of the car are preferably formed of sheet metal plates 34 which may or may not extend continuously from the ends of the car down to the hoppers 2. At their upper ends the slope sheets 34 preferably rest upon and are secured to inwardly projecting flanges 136 of the end sheets 4 of the car. As may be clearly seen in Figure 25, these end sheets 4 are secured to the outer faces of the depending legs of the end top rail 6 and to the inner faces of the legs 135 of the corner posts. Intermediate their ends the slope sheets rest upon and are secured to the top inclined flanges of the body bolsters 11, while at their lower ends they may be conveniently secured to the slope sheets 137 of the hoppers. Each of the slope sheets 34 is preferably rectangular in shape, being substantially of a width equal to the distance between the inner faces of the side stakes 10.

The slope sheets are respectively connected to the side sheets of the car by members generally designated "angle A" and "angle B." The angles "A" are respectively disposed between the ends of the car and the side stakes 10, being employed to connect the slope sheets to the adjacent end side sheets 8, while the angle members "B" are respectively disposed between the side stakes 10 and adjoining side stakes 10ª.

The angle "A" is formed with a substantially upright flange or leg 32 and a procumbent leg 35 substantially normal thereto, the former being secured to the inner face of the adjacent end side sheet and the latter to the under surface of the adjoining portion of the slope sheet 34. Since the end side sheet terminates above the lower edge of the angle "A", the leg 32 thereof at one end is fashioned with an offset portion 138 to contact with and be secured to the adjacent portion of the neighboring corner post 12. At its other end the leg 32 is provided with an offset portion 37 so that it may overlap the inner face of the outer flange 124 of the adjacent side stake 10 and be secured thereto by any suitable means, such as rivets. At this end of the angle "A" the procumbent leg 35 thereof rests upon and is preferably secured to the top portion of the underlying body bolster. Thus, it will be perceived, a very simple means is employed for supporting and rigidly connecting the slope sheets to the end side sheets 8 and to adjacent portions of the car construction.

Each of the angles "A" is preferably integrally formed with a transversely inclined portion 31 which is in alinement with the side stake 10 longitudinally of the car. In this manner the interior of the car at the points of intersection of the planes of the slope sheets and the end side sheets is provided with transversely inclined surfaces so that, when the lading of the car is being discharged therefrom through drop doors, substantial quantities of the lading will not be entrapped or retained by the side stakes projecting inwardly from the sides of the car, thereby greatly facilitating the discharge of lading.

As the transversely inclined portions 31 of the angles "A" may, to accomplish their purpose, terminate in a line parallel with the car sides and adjacent the inner edges of the side stakes, they preferably decrease in width as the distances transversely of the car between oppositely disposed end side sheets decrease as they converge toward each other. Since it is desirable to form the angles "A" from a substantially rectangular sheet of metal, the upright legs 32 thereof increase in height as they approach the end of the car in accordance with the decrease in width of the inclined portions 31. To afford an increased area for connecting the legs 32 of the angles "A" to the adjacent side stakes 10 the inclined portions 31 may conveniently terminate at the offsets 137 formed therein. Of course, it will be appreciated that the interior surface of the car may be formed in a variety of ways with transversely inclined portions and my invention is not limited to forming these inclines in separate members employed for connecting the end side sheets and slope sheets, as it is well known that these sheets of the car may be connected without the intervention of separate means.

The angle "B" employed for connecting the portions of the side sheets 3 intermediate the side stakes 10 and 10ª to the slope sheets are of a form similar to the angles "A," each having an upright flange or leg 41 and a procumbent flange or leg 42. The flanges 41 are adapted to overlap and be secured to the inner faces of the side sheets 3, while the flanges 42 are adapted to underlie and be secured to the slope sheets 34. The end of the angle adjacent the bolster may be conveniently fashioned with a cut out portion 48 to receive adjacent portions of the adjoining side stake 10. At its opposite end the flange 41 is shaped to conform to the contour of the adjoining side sill and have extended contact therewith, the portion 139 thereof being adapted to be secured to the inner face of the vertical leg 51 of the side sill, the portion 140 being adapted to be secured to the inclined web 55 of the sill and the portion 141 being adapted to be secured to the bottom flange 115 of the sill. In this manner a very rigid connection is obtained between the slope sheet supporting and connecting angles "B" and the side sills. As with angle "A", angle "B" is formed with a portion 43 affording the interior of the car with a transversely inclined surface in alinement with the side stakes longitudinally of the car, which only extends between the side stakes 10 and 10ª.

Thus, the angle "B", in addition to serving as means connecting the side sheets and slope sheets, functions to also facilitate the discharge of lading through the drop bottom doors of the car.

At their lower ends the angles "B," as may be clearly seen in Figure 31, may advantageously be secured to the slope sheets and the outer side walls of the hoppers. The outer side walls of the hopper are also preferably secured to the bottom flange 115 of the side sill whereby, since these sheets are subject to rapid corrosion, they may be easily replaced without disturbing the connection between the side sheets of the car and the sills.

To support the upper edge of the angle "B," and, consequently, adjoining portions of the slope sheet of the car, a bracket 38 is rigidly secured to the side stake 10 by a rivet passing through the bracket and the web of the side stake. Each bracket 38 is formed with a portion adapted to embrace the inner flange 123 of the side stake and an adjoining flange of a reinforcing angle member 39 secured to the bolster. In addition to serving to support the angles "B" and the slope sheets 34, the brackets also serve to prevent the escape of fine lading between the side stakes on the one hand and the angles "B" and slope sheets on the other. The upper surfaces of the brackets are, of course, inclined so as to lie in planes parallel with the inclined slope sheets.

From the foregoing it will be perceived that a railroad car has been produced having maximum revenue earning capacity within the prescribed clearance limitations and that the interior of the car is formed with a plurality of transversely inclined surfaces which facilitate the discharge of lading from the car whether this is accomplished by inverting the car or by opening the drop doors in the bottom thereof. It will also be perceived that a very rigid and strong connection is obtained between the converging end side sheets of the car and the slope sheets and also between the latter and the main side sheets and that rugged means is employed for supporting portions of the slope sheets adjoining the side sheets at the side stakes.

I claim:

1. A freight car having end side sheets extending inwardly toward each other from adjacent the body bolster to the end of the car, a portion of each of the end side sheets sloping inwardly and upwardly.

2. A freight car having end side sheets extending toward each other from adjacent the body bolster to the end of the car to thereby provide spaces for safety appliances within the natural sides of the car, the upper portions of each of said end side sheets sloping upwardly and inwardly toward each other.

3. A freight car having end side sheets extending slightly inwardly toward each other from adjacent the body bolster to the end of the car, each of said end side sheets having a portion sloping inwardly and upwardly and a vertical portion merging with the said sloping portion.

4. An end side sheet for a car comprising a portion adapted to extend parallel with the normal side of the car, a portion extending at an angle to said parallel portion adapted to be fastened along one of its edges to a corner post of the car, and an upper portion inclined inwardly and upwardly with respect to the first mentioned portion of the sheet, said inclined portion decreasing in width as it approaches the edge of the sheet adapted to be fastened to the corner post.

5. An end side sheet for a car comprising a vertical portion adapted to extend parallel with the normal side of the car, a portion extending at an angle to said parallel portion adapted to be fastened along one of its edges to a corner post of the car, and an upper portion bent inwardly and upwardly with respect to the first mentioned portion of the sheet, said inwardly bent portion decreasing in width as it approaches the edge of the sheet adapted to be fastened to the corner post, the extreme upper edge of the sheet lying in a substantially vertical plane.

6. An end side sheet for a freight car, being of greater height adjacent one edge than adjacent the opposite edge, the portion of the sheet adjacent one of said edges extending at an angle to other portions of the sheet, the upper portion of the sheet sloping inwardly and upwardly, said sloping portion increasing in width from adjacent one edge of the sheet toward the other, and the upper edge of the sheet being disposed in a substantially vertical plane.

7. An end side sheet for a freight car comprising a body portion 20, the end portion 21, the inwardly and upwardly sloping portion 23, and the vertically extending portion 24.

8. A freight car having its end sides restricted, side stakes adjacent the points of the beginning of the restricted ends, slope sheets extending from the ends of the car toward the center thereof, and trough-like members respectively disposed in the angles formed by the slope sheets and restricted sides.

9. A freight car having sides, corner posts, side stakes, and end side sheets extending at an angle to the normal sides of the car between the said side stakes and corner posts, said corner posts having their upper portions flared to receive the respective edges of the said end side sheets.

10. A freight car having sides, corner posts, Z-bar side stakes adjacent the corner posts, and end side sheets extending at an angle to the normal sides of the car between the Z-bars and said corner posts, said corner posts having their upper portions flared to receive the respective edges of said side sheets.

11. A freight car having sides, corner posts of substantially angle shape, the angle formed by the legs of each of the posts being greater than a right angle, and end side sheets extending from the sides of the car to the respective corner posts, the body portions of the respective end sheets being disposed in planes parallel with the adjacent leg of the associated corner post.

12. A freight car having corner posts of substantially angle shape, side stakes situated near the respective corner posts, and side sheets extending inwardly from the respective side stakes toward the end of the car, one leg of each of said corner posts being flared to lie parallel with the major portion of the adjacent end sheet for attachment thereto.

13. A freight car having corner posts of angle shape, one leg of each of said posts being flared, side stakes, and end side sheets extending from the side stakes inwardly toward the respective corner posts, the flared legs of the corner posts being secured to adjacent portions of the respective side sheets and being respectively disposed in planes parallel therewith, the edge of each end side sheet opposite the one secured to the corner post being disposed in a plane parallel with the normal sides of the car.

14. A freight car having four corner posts and four side stakes respectively situated at a distance from said corner posts, said side stakes being inwardly inclined adjacent their upper ends, and end side sheets having similarly inwardly inclined portions secured to the inclined portions of the respective side stakes, said end side sheets converging from adjacent the side stakes to the corner posts.

15. A freight car having four end corner posts, four side stakes respectively situated at a distance from said corner posts, each of said side stakes being inclined inwardly adjacent its upper end, and end side sheets having similarly inclined upper portions secured to the respective inclined portions of the side stakes, one edge of each of said sheets lying parallel with and secured to the adjacent portion of its associated side stake, said end side sheets converging from adjacent the side stakes to the corner posts.

16. A freight car having corner posts at one of its ends, side stakes respectively spaced from said corner posts, and an end side sheet extending from each side stake to the adjacent corner post, the upper portions of the side stakes and end sheets extending inwardly and upwardly and the said inwardly and upwardly extending portions of the end side sheets decreasing in width as they approach the corner posts.

17. A freight car having corner posts at one of its ends, each of said posts having a flared portion, side stakes spaced from said corner posts, end side sheets respectively extending between the corner posts and side stakes and each having a portion secured to the flared portion of the adjacent corner post and a portion secured to the adjacent side stake, the upper portion of the end side sheets and side stakes being inclined upwardly and inwardly.

18. In a freight car, a corner post, a side stake, an end side sheet having one edge secured to the corner post and its opposite edge secured to the side stake, the upper portion of the side stake and side sheet being inwardly inclined, the inclined portion of the sheet decreasing in width as it approaches the corner post.

19. In a freight car, a corner post, a Z-bar side stake, an end side sheet having one edge secured to the corner post and its opposite edge secured to the Z-bar, the upper portion of the side stake and end side sheet being upwardly and inwardly inclined, the inclined portion of the sheet decreasing in width as it approaches the corner post, the upper edge of said sheet being disposed in a substantially vertical plane, a bracket riveted to said sheet and side stake, and a top rail overlying the upper edge of said sheet and said bracket.

20. A freight car having spaced sides and restricted end side sheets, a slope sheet extending downwardly from each end of the car, and trough-like angles respectively secured to said slope sheets and to the restricted end side sheets of the car.

21. A freight car having spaced sides, end side sheets converging from the normal sides of the car toward the ends, trough-like angles secured to said end side sheets and a slope sheet secured to and extending between the trough-like angles at each end of the car.

22. A freight car having spaced sides, end side sheets converging toward the ends of the car to thereby provide spaces within the normal sides of the car, slope sheets secured to the ends of the car, and trough-like angles secured to the respective end side sheets, said slope sheets being supported adjacent their opposite edges by said trough-like angles.

23. A freight car having sides, end side sheets at each end of the car extending slightly inwardly toward each other as they approach the end of the car, a trough-like angle secured to each of said side sheets having an inwardly inclined portion increasing in width from adjacent one end thereof to the other, and a slope sheet extending between said trough-like angles at each end of the car.

24. A freight car comprising in part on one side, an end side sheet extending inwardly toward the end of the car, a trough-like angle having one leg secured to the end side sheet adjacent its lower edge, said trough-like member also having an inclined portion increasing in width from adjacent one end thereof to the other, and a slope sheet secured to the other leg of said angle.

25. A freight car having sides tapering near their opposite ends, a slope sheet extending from each end of the car toward the center thereof, two trough-like angle supports on each side of each slope sheet, said angles extending substantially throughout the length of the slope sheets.

26. A freight car having sides, the ends of said sides converging as they approach the ends of the car, the said end sides adjacent their upper portions sloping upwardly and inwardly at the point where they start to converge, a slope sheet at each end of the car extending toward the center thereof, and two trough-like angles connected to each side of each slope sheet, one of each of said angles being secured to the adjacent end side of the car.

27. A trough-like angle A having the leg 32, the leg 35, and the ever widening portion 31.

28. A trough-like angle A having the leg 32, the flared portion 31, the leg 35, the said flare-like portion extending from one end of the angle to adjacent the other.

29. A freight car having corner posts, side stakes, end side sheets extending between the respective side stakes and corner posts, a slope sheet extending from an end of the car toward the center thereof, and two trough-like angles on each side of the slope sheet, the end of one of said angles being secured to the adjacent side stake and said slope sheet being supported by said trough-like angles.

30. In a freight car having sides restricted at their ends, a slope sheet extending from each end of the car toward the center, side stakes on opposite sides of the car adjacent the points of restriction, and trough-like angles respectively secured to opposite sides of each slope sheet, said side stakes and lower ends of the angles being adapted to be secured to the side sills of the car.

31. A freight car having on each side end side sheets 8, a trough-like angle A, a trough-like angle B, and a slope sheet 34 secured between the two sets of angles A and B.

32. A freight car having sides restricted at their ends, slope sheets respectively extending from each end of the car toward the center thereof and positioned between said restricted end sides, and two angles on each side of the car adjacent the end thereof for supporting the respective slope sheets, each of said angles having its central portion inclined to provide a sloping surface between the adjacent side of the car and slope sheet.

33. A freight car having side stakes, side sheets respectively extending from the side stakes inwardly toward the ends of the car, a slope sheet extending between the side sheets at each end of the car, and trough-like angles respectively secured to the said end side sheets and the associated slope sheets for supporting the latter.

34. A freight car having end side sheets, side stakes respectively connected to said side sheets, said stakes being adapted to be secured to the body bolsters of the car, a slope sheet extending between the side sheets at each end of the car, and trough-like angles respectively secured to the said side sheets and slope sheets for supporting the latter, one end of each of said trough-like angles being secured to the adjacent side stakes.

35. A freight car having its sides restricted adjacent its opposite ends, side stakes adjacent the ends of the car, slope sheets respectively extending from the ends of the car toward the center thereof, and angle supports at opposite sides of the slope sheets for connecting them to adjacent portions of the restricted sides of the car, said supports being respectively secured to the side stakes.

36. A freight car of the hopper type having slope sheets, trough-like angle members respectively disposed on opposite sides of the slope sheets for supporting the latter, and brackets for respectively supporting one end of each of said angle members.

37. A freight car having sides, a slope sheet, a plurality of angle members on each side of the slope sheet for connecting it to the respective sides of the car, each of said angle members having a portion inclined transversely of the car, side stakes positioned between the inner adjacent ends of the angle members, and brackets respectively adjacent the inner ends of said angle members for supporting one of said members.

38. A freight car having cross bearers of composite form, and tie rods extending downwardly and inwardly from the sides of the car and fastened to said cross bearers.

39. A freight car comprising in part a cross bearer formed of a plurality of plates, side stakes at the opposite ends of said cross bearer, and tie rods extending inwardly from said stakes and secured to the cross bearer adjacent its central portion.

40. A freight car involving a cross bearer comprising end plates and a center plate, side stakes at the respective outer ends of the end plates of the cross bearer, and tie rods respectively connected to said side stakes and to the center plate of the cross bearer.

41. A freight car involving a cross bearer comprising two end plates and a center plate, the latter extending above the inner adjacent ends of said end plates, side stakes respectively positioned adjacent the outer ends of said end plates, tie rods respectively connected to said side stakes and to the center plate of the cross bearer, said rods being connected to the latter in overlapping relation, and a horizontal member connected to the side stakes adjacent the upper ends of the tie rods.

42. A freight car comprising a cross bearer of composite form, side stakes respectively connected at their lower ends to opposite ends of said cross bearer, and tie rods respectively connected to the cross bearer and to the upper portions of said side stakes.

43. A freight car of the hopper type having a plurality of Z-bar side stakes, cross bearers respectively connected to said side stakes, tie rods respectively extending from adjacent the upper portions of the side stakes to adjacent the central portions of the cross bearers, and a brace respectively connected to the upper ends of tie rods connected to each cross bearer.

44. A freight car involving a cross bearer comprising a plurality of plate-like members, means connecting said members, side stakes respectively secured to opposite ends of said cross bearer, and tie rods respectively connected to the upper portions of said side stakes and to the central portion of the cross bearer.

45. A freight car involving a cross bearer comprising a plurality of members, and means connecting said members, side stakes respectively secured to opposite ends of said cross bearer, tie rods respectively connected to the upper portions of said side stakes and to the central portion of said cross bearer, and a member connecting the upper ends of said tie rods.

46. A freight car involving a cross bearer, side stakes respectively secured to opposite ends of the cross bearer, and tie rods respectively connecting the upper portions of the side stakes and the central portion of the cross bearer, each of said tie rods being formed with a laterally projecting flange, the flange of one tie rod projecting in a direction opposite to the flange of the other tie rod.

47. A freight car involving a cross bearer, side stakes respectively secured to opposite ends of the cross bearer, and tie rods respectively connecting the cross bearer and side stakes, said rods being crossed at their lower ends and secured to the central portion of the cross bearer and being secured at their upper ends to the side stakes.

48. A freight car involving a cross bearer, side stakes respectively secured to opposite ends of the cross bearer, flanged tie rods respectively connecting the upper portions of the side stakes and the central portion of the cross bearer, and a member connecting the upper portions of said tie rods, the latter respectively overlapping opposite faces of said member.

49. A freight car having end side sheets, said sheets converging inwardly toward the car ends from points respectively adjacent the edges thereof remote from the car ends, the upper portion of each of said sheets being inclined inwardly and upwardly, said inclined portion gradually decreasing in width toward the ends of the car.

50. In a freight car having corner posts and parallel side sheets, the combination with end side sheets, each of said end side sheets having a portion secured to the adjacent parallel side sheet and disposed in a plane parallel therewith, said end side sheets respectively converging toward the ends of the car from adjacent their points of attachment to the parallel side sheets, the upper portion of each of said end side sheets being inclined inwardly and upwardly.

51. In a railway car having a side and a longitudinally inclined floor portion, a side stake projecting upwardly from said inclined floor portion intermediate the ends thereof in overlapping relation to the inner face of the car side, the car being provided on its interior with a transversely inclined surface extending downwardly away from the car side in alinement with the stake longitudinally of the car.

52. A railway hopper car having substantially vertical end sheets and side sheets, inclined floor sheets and side stakes projecting inwardly beyond the side sheets, the car being provided on its interior between the end sheets and adjacent side stakes with transversely inclined surfaces in alinement with the stakes longitudinally of the car, said inclined surfaces being disposed in the angles formed by the intersection of the planes of the side sheets and floor sheets.

53. A railway car having side sheets and slope sheets, side stakes projecting inwardly beyond the side sheets, and means providing the interior of the car with portions inclined transversely thereof in alinement with the side stakes longitudinally of the car.

54. A railway car having side sheets and slope sheets, side stakes projecting inwardly beyond the side sheets, and means connecting said side sheets and slope sheets, each of said means being provided with a portion inclined transversely of the car in alinement with the side stakes longitudinally of the car.

55. A railway car having side sheets and slope sheets, side stakes projecting inwardly beyond the side sheets, and angle members respectively connecting the side sheets and slope sheets, each of said angle members being integrally formed with a portion inclined transversely of the car in alinement with the adjacent side stake longitudinally of the car.

56. A railway car having substantially vertical end sheets and side sheets, slope sheets, and side stakes projecting inwardly beyond the side sheets, the interior of the car on each side of the side stakes adjacent the end sheets being provided with transversely inclined surfaces in alinement with the side stakes longitudinally of the car, said surfaces being disposed in the angles formed by the intersection of the planes of the side sheets and slope sheets.

57. A railway car having side sheets and slope sheets, side stakes projecting inwardly beyond the side sheets, and means disposed on each side of the side stakes adjacent the ends of the car for connecting the adjacent slope sheets and side sheets, each of said means being provided with portions inclined transversely of the car in alinement with the said side stakes longitudinally of the car.

58. A railway car having side sheets, the end side sheets converging inwardly toward the end of the car, slope sheets, and side stakes projecting inwardly beyond said side sheets, the car being provided on its interior adjacent the end side sheets with transversely inclined surfaces in alinement with the side stakes longitudinally of the car, said transversely inclined portions decreasing in width toward the ends of the car.

59. A railway car having side sheets, the end side sheets converging inwardly toward the respective ends of the car, slope sheets, side stakes projecting inwardly beyond the side sheets, and means connecting the slope sheets and end side sheets, each of said means being provided with a portion inclined transversely of the car in alinement with the adjacent side stake longitudinally of the car.

60. A railway car having side sheets, the end side sheets converging toward the ends of the car, slope sheets, side stakes projecting inwardly beyond the side sheets, and angle members for respectively connecting the slope sheets and end side sheets, each of said angle members being provided with a transversely inclined portion in alinement with the adjacent side stake longitudinally of the car, each of said inclined portions decreasing in width toward the ends of the car.

61. A railway car having side sheets, side stakes projecting inwardly beyond the side sheets, slope sheets, and means connecting said side sheets and slope sheets, said means being respectively adapted to be secured to and have extended contact with the side sills of the car.

62. A railway car having side sheets, side stakes projecting inwardly beyond the side sheets, slope sheets, and angle members respectively connecting the side sheets and slope sheets, each of said angle members having a transversely inclined portion in alinement with the side stakes longitudinally of the car, said angle members being adapted to be secured to and have extended contact with the car side sills.

63. A railway car having side sheets, side stakes projecting inwardly beyond the side sheets, slope sheets, and means for connecting the side sheets and slope sheets, said means having transversely inclined portions in alinement with the side stakes longitudinally of the car and being adapted to be secured to the side stakes and to the side sills of the car.

64. A railway car having side sheets, side stakes projecting inwardly beyond the side sheets, slope sheets, and a plurality of angle members for respectively connecting the slope sheets and side sheets, each of said angle members being provided with a transversely inclined portion in alinement with the side stakes longitudinally of the car, one of said angle members on each side and adjacent each end of the car being adapted to be secured to the adjacent side stake and the other of said members being adapted to be secured to the adjacent car side sill.

65. A railway car having an inclined floor, and side stakes, said side stakes being respectively provided with portions underlying adjacent portions of the inclined floor for supporting the latter.

66. A railway car having an inclined floor, side stakes intermediate the ends of said inclined floor, each of said side stakes having a projecting portion provided with an inclined upper surface for supportingly cooperating with the undersides of adjacent portions of the inclined floor.

67. A railway car having sides and an inclined floor, side stakes projecting inwardly beyond the car sides and brackets underlying said inclined floor and respectively secured to said side stakes for supporting adjacent portions of the floor.

68. A railway car having sides and an inclined floor, and side stakes projecting inwardly beyond the car sides, said side stakes being disposed intermediate the ends of the said inclined floor and each being provided with means underlying the floor for supporting adjacent portions thereof.

69. A railway car having sides and an inclined floor, Z-bar side stakes projecting inwardly beyond the car sides intermediate the ends of the said floor, and a bracket embracingly secured to one flange of each side stake for supporting adjacent portions of the car floor.

70. In a railway hopper car having reduced ends, the combination with side sheets and inclined floor sheets, of side stakes projecting inwardly beyond the side sheets, the car being provided on its interior with downwardly and inwardly transversely inclined surfaces in alinement with the side stakes longitudinally of the car, the planes of said inclined surfaces intersecting the slope sheets in substantially parallel lines.

71. In a railway hopper car having reduced ends, the combination with side sheets and inclined floor sheets, of side stakes projecting inwardly beyond the side sheets, the car being provided on its interior with transversely inclined surfaces in alinement with the side sheets longitudinally of the car, said surfaces being respectively disposed in planes intersecting the slope sheets adjacent the inner edges of the side stakes which are next to the car ends.

WILLIAM E. WINE.